(12) United States Patent
Wakuda

(10) Patent No.: US 11,861,067 B2
(45) Date of Patent: Jan. 2, 2024

(54) TACTILE-SENSATION PROVIDING DEVICE

(71) Applicant: ALPS ALPINE CO., LTD., Tokyo (JP)

(72) Inventor: Hiroshi Wakuda, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/805,532

(22) Filed: Jun. 6, 2022

(65) Prior Publication Data

US 2022/0300077 A1    Sep. 22, 2022

Related U.S. Application Data

(63) Continuation of application No. PCT/JP2020/045095, filed on Dec. 3, 2020.

(30) Foreign Application Priority Data

Dec. 27, 2019   (JP) .................................. 2019-239833

(51) Int. Cl.
  *G06F 3/01* (2006.01)
  *B06B 1/04* (2006.01)
  *G06F 3/041* (2006.01)

(52) U.S. Cl.
  CPC .............. *G06F 3/016* (2013.01); *B06B 1/045* (2013.01); *G06F 3/041* (2013.01)

(58) Field of Classification Search
  None
  See application file for complete search history.

(56) References Cited

U.S. PATENT DOCUMENTS

| 2013/0201127 A1* | 8/2013 | Abe ..................... G06F 3/016 345/173 |
| 2014/0077661 A1 | 3/2014 | Smirnov et al. |
| 2015/0153829 A1 | 6/2015 | Shiraishi |
| 2016/0103493 A1 | 4/2016 | Taninaka et al. |

FOREIGN PATENT DOCUMENTS

| JP | 2013-161384 | 8/2013 | |
| JP | WO2019003870 | * 1/2019 | ............. H02K 33/16 |
| WO | 2013/183191 | 12/2013 | |
| WO | 2014/207855 | 12/2014 | |

OTHER PUBLICATIONS

International Search Report for PCT/JP2020/045095 dated Jan. 12, 2021.

* cited by examiner

*Primary Examiner* — Ifedayo B Iluyomade
(74) *Attorney, Agent, or Firm* — IPUSA, PLLC

(57) ABSTRACT

The present invention provides a tactile-sensation providing device that reduces the transmission of vibration to the base part. The tactile-sensation providing device has: a vibrating body; a vibration-target object that is elastically connected with the vibrating body and vibrated in accordance with vibration of the vibrating body; and a base part that is elastically connected with the vibration-target object, the tactile-sensation providing device providing a tactile sensation to a living body based on vibration of the vibration-target object, the base part is spaced apart from the vibrating body, and a resonance frequency of a first vibrating system including the base part and the vibration-target object is ⅔ or less of a resonance frequency of a second vibrating system including the vibration-target object and the vibrating body.

19 Claims, 11 Drawing Sheets

TACTILE-SENSATION PROVIDING DEVICE

CROSS-REFERENCE TO RELATED APPLICATION

This application is a continuation application of International Application No. PCT/JP2020/045095, filed on Dec. 3, 2020, and designated the U.S., which is based upon and claims priority to Japanese Patent Application No. 2019-239833, filed on Dec. 27, 2019, the entire contents of which are incorporated herein by reference.

BACKGROUND OF THE INVENTION

1. Field of the Invention

The present invention relates to a tactile-sensation providing device.

2. Description of the Related Art

Conventionally, there is an electronic device, in which a vibrating element is attached to a touch panel, and the touch panel and the housing are fixed with each other using double-sided tape (see, for example, Patent Document 1).

RELATED-ART DOCUMENTS

Patent Document

[Patent Document 1] International Publication No. 2014/207855

With the above conventional electronic device, the touch panel having the vibrating element attached therewith and the housing are fixed with each other by using double-sided tape, and therefore the vibrating element's vibration is easily transmitted to the base part such as the housing.

SUMMARY OF THE INVENTION

The tactile-sensation providing device according to the embodiment of the present invention has: a vibrating body; a vibration-target object that is elastically connected with the vibrating body and vibrated in accordance with vibration of the vibrating body; and a base part that is elastically connected with the vibration-target object, the tactile-sensation providing device providing a tactile sensation to a living body based on vibration of the vibration-target object, the base part is spaced apart from the vibrating body, and a resonance frequency of a first vibrating system including the base part and the vibration-target object is ⅔ or less of a resonance frequency of a second vibrating system including the vibration-target object and the vibrating body.

According to the present invention, it is therefore possible to provide a tactile-sensation providing device that reduces the transmission of vibration to the base part.

DESCRIPTION OF THE PREFERRED EMBODIMENTS

Now, an embodiment that employs the tactile-sensation providing device of the present invention will be described below.

According to the present invention, it is possible to provide a tactile-sensation providing device that reduces the transmission of vibration to the base part.

EMBODIMENT

Figure 1:
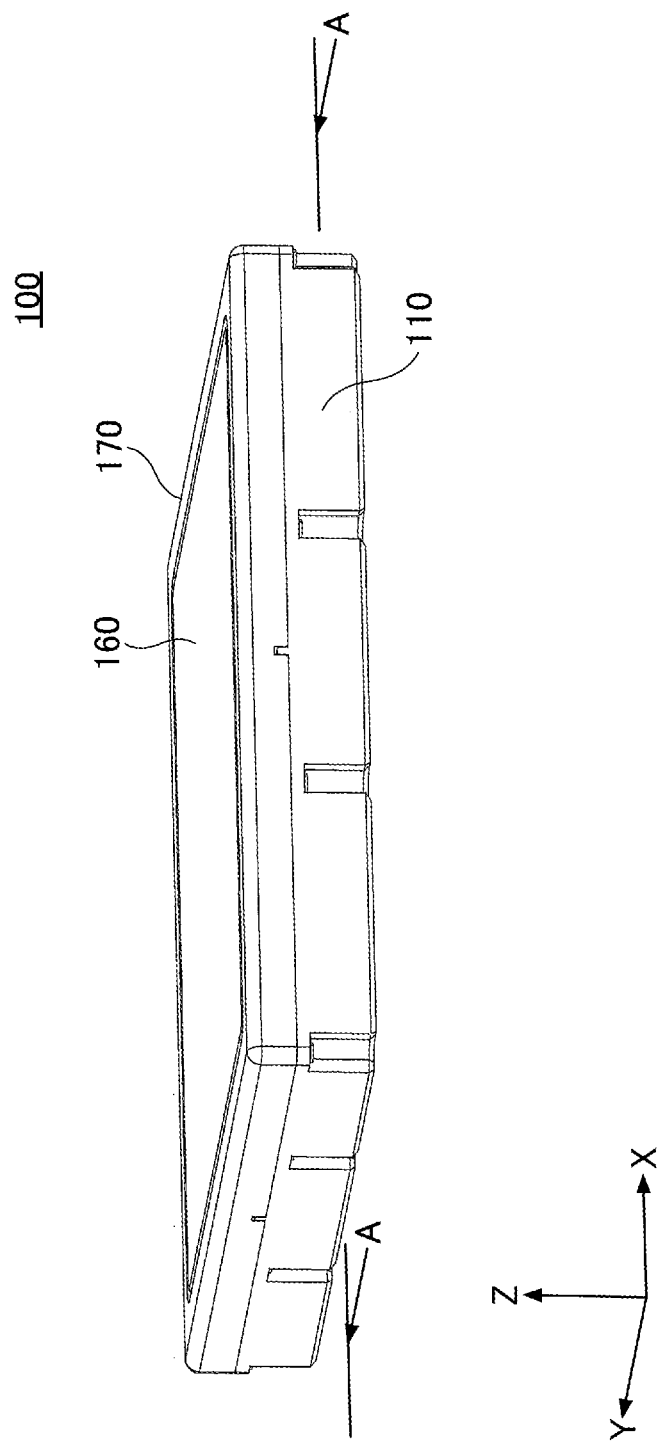
FIG. 1 is a perspective view that illustrates a tactile-sensation providing device 100 according to an embodiment.
Figure 2:
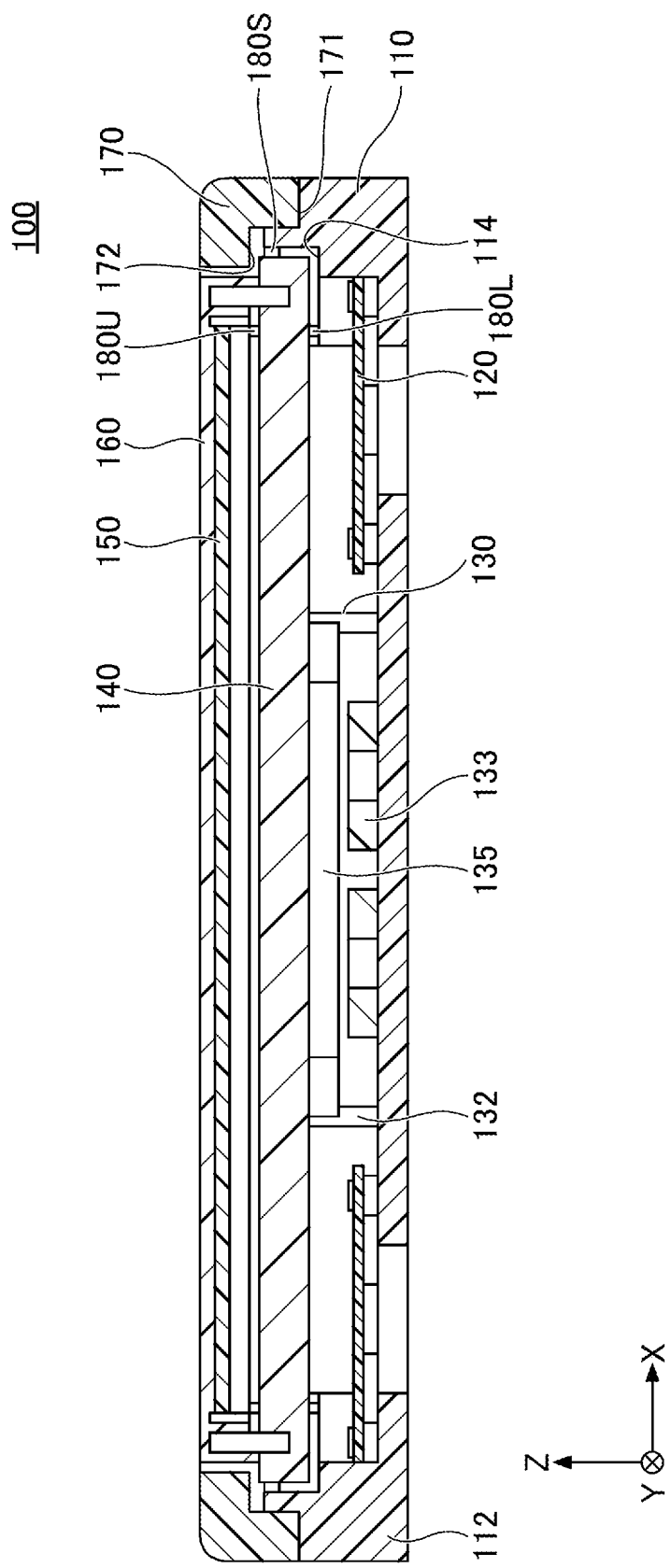
FIG. 2 is a cross-sectional view taken along line A-A in FIG. 1.
Figure 3:
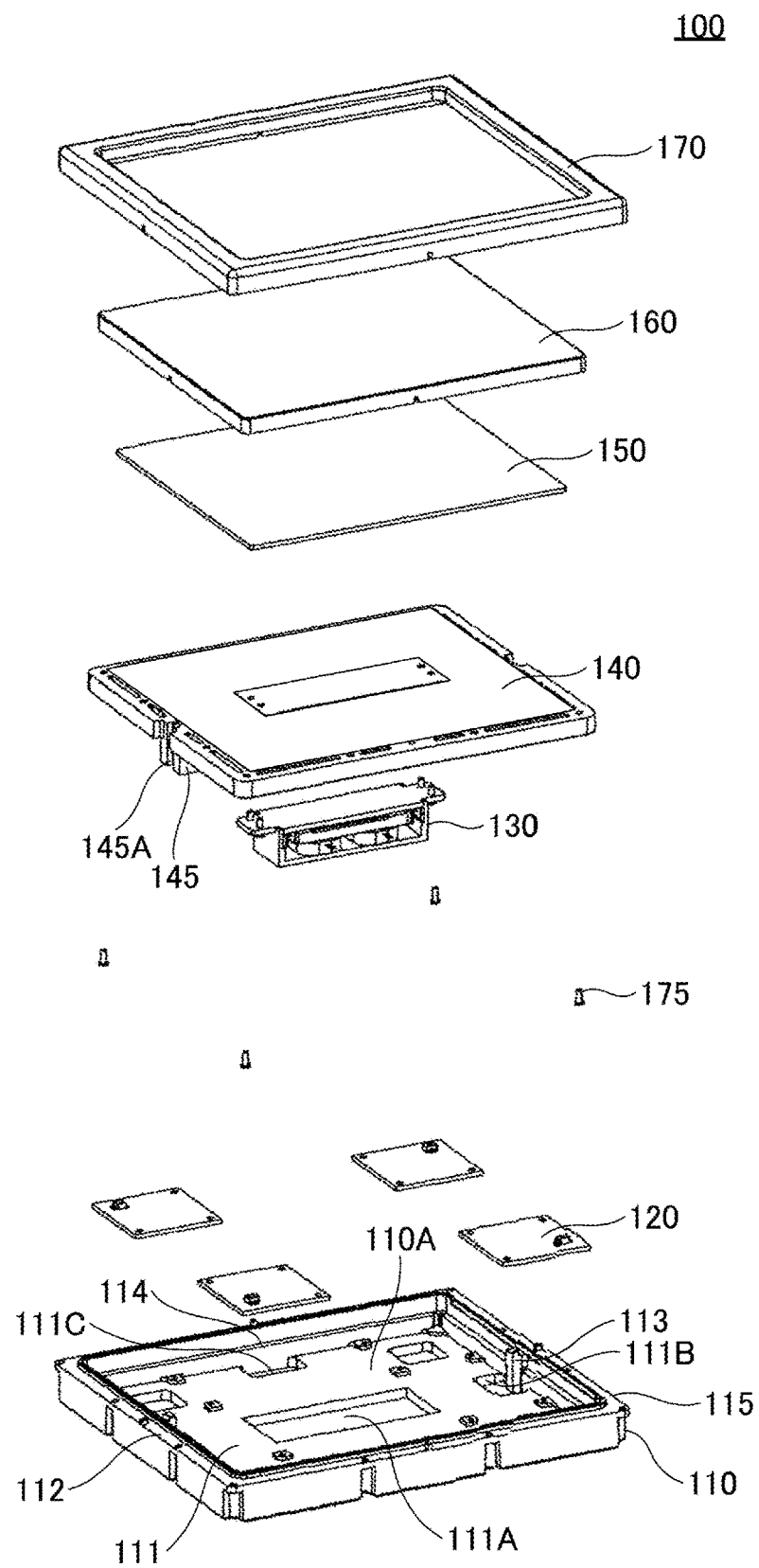
FIG. 3 is an exploded view of the tactile-sensation providing device 100.

FIG. 1 is a perspective view that illustrates a tactile-sensation providing device 100 according to the embodiment. FIG. 2 is a cross-sectional view taken along line A-A in FIG. 1. FIG. 3 is an exploded view of the tactile-sensation providing device 100.

An XYZ coordinate system will be defined in the following description. Also, for ease of explanation, in the following description, "plan view" refers to "XY plane view," and, while the negative Z-axis direction will refer to the lower side or below and the positive Z-axis direction will refer to the upper side or above, these do not represent the relationship universally regarded as "up" and "down."

The tactile-sensation providing device 100 includes a base 110, gap sensors 120, an actuator 130, a movable part 140, an electrostatic sensor 150, an operating panel 160, a bezel 170, and screws 175.

Figure 4:
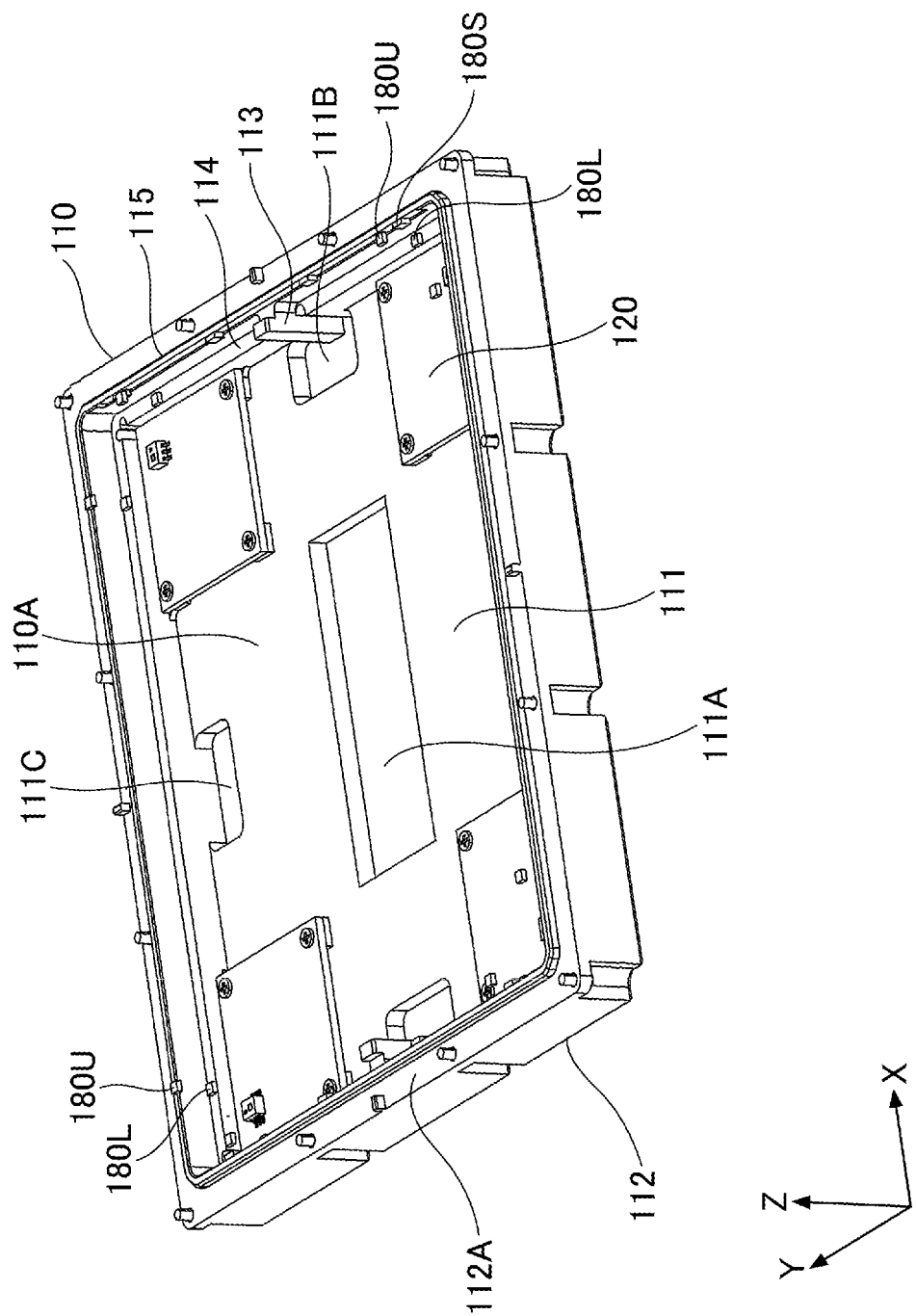
FIG. 4 is a diagram that illustrates a base 110 and gap sensors 120.
Figure 5:
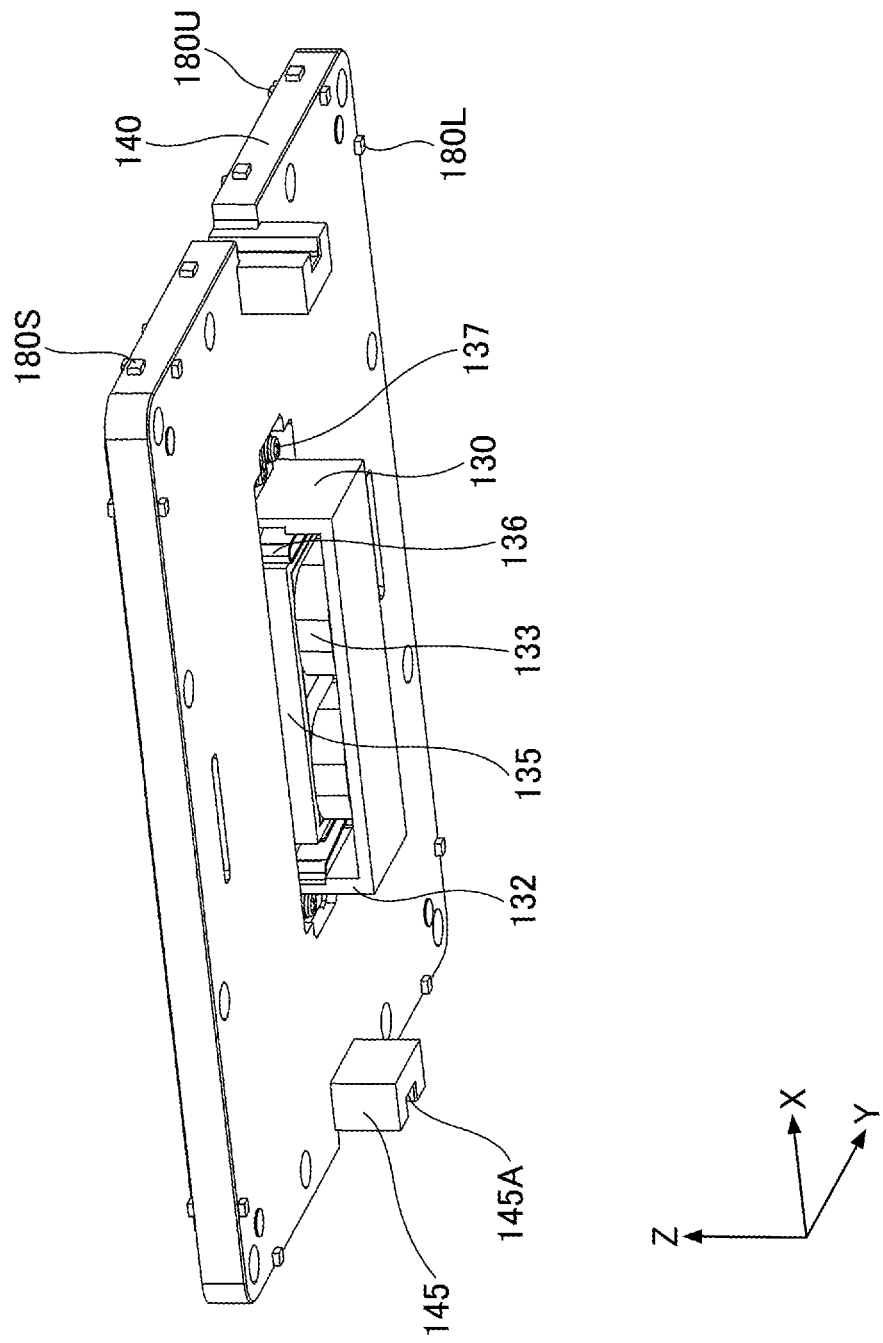
FIG. 5 is a diagram that illustrates an actuator 130 and a movable part 140.
Figure 6:
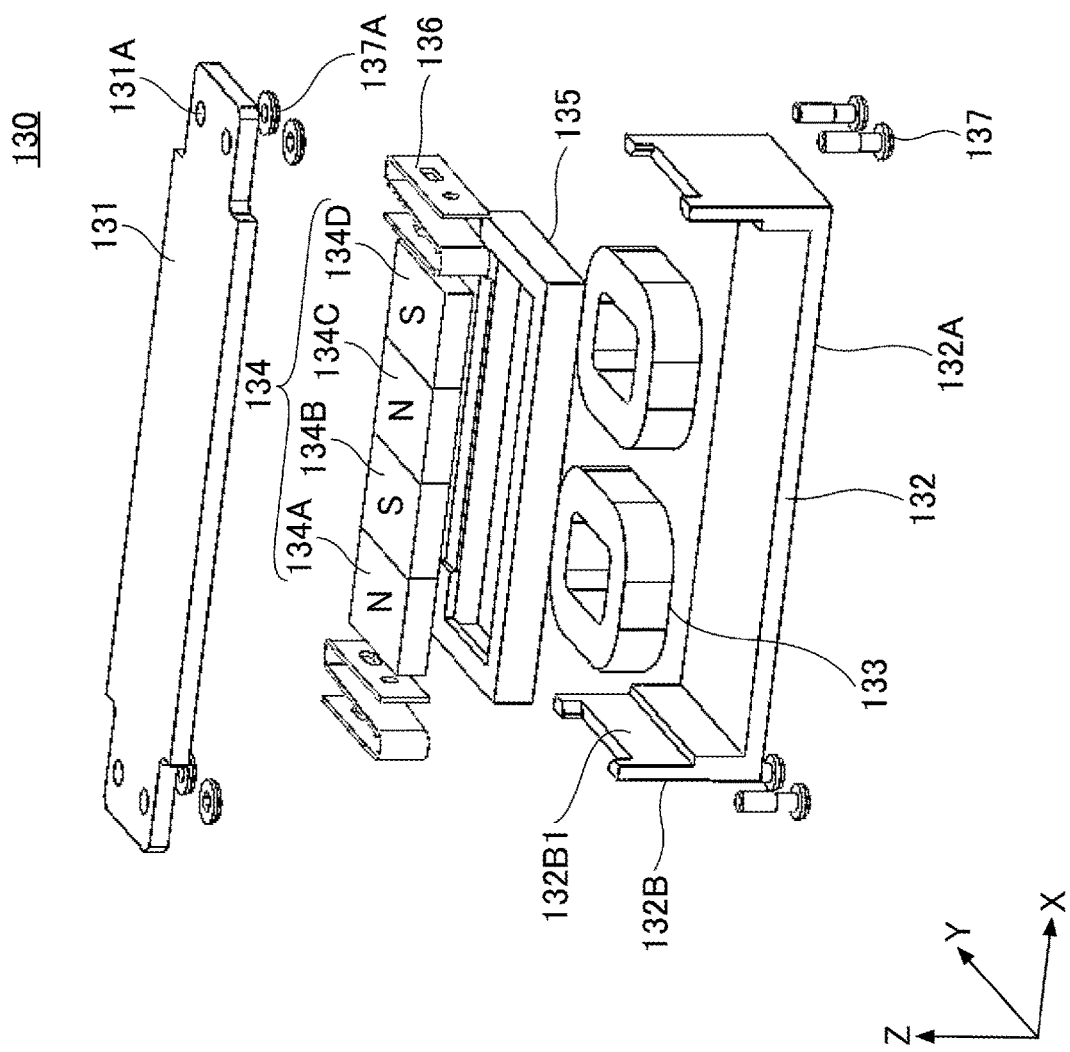
FIG. 6 is an exploded view that illustrates the actuator 130.

Also, the following description will be given with reference FIG. 4 to FIG. 6, in addition to FIG. 1 to FIG. 3. FIG. 4 is a diagram that illustrates the base 110 and the gap sensors 120. FIG. 5 is a diagram that illustrates the actuator 130 and the movable part 140. FIG. 6 is an exploded view that illustrates the actuator 130.

The tactile-sensation providing device 100 further includes rubber members 180S, 180L, and 180U, which are elastic bodies (see FIG. 4 and FIG. 5).

Here, the base 110 and the bezel 170 are examples of the base part to be attached to an external object so as to lay the foundation for the tactile-sensation providing device 100. The magnet 134 and the holder 135 of the actuator 130 are examples of the vibrating body (see FIG. 6). Parts of the actuator 130 other than the magnet 134 and the holder 135 (a top yoke 131, a bottom yoke 132, drive coils 133, springs 136, screws 137, and washers 137A (see FIG. 6)), a movable part 140, the electrostatic sensor 150, and the operating panel 160 constitute examples of the vibration-target object.

The vibrating arrangement to include the base part and the vibration-target object will be hereinafter referred to as a "first vibrating system." This vibrating system, composed of examples of the base part (the base 110 and the bezel 170), examples of the vibration-target object (the top yoke 131, the bottom yoke 132, the drive coils 133, the springs 136, the screws 137, and the washers 137A of the actuator 130), the movable part 140, the electrostatic sensor 150, and the operating panel 160), and examples of elastic bodies (the rubber members 180S, 180L, and 180U) that connect between the base parts and the vibration-target objects elastically, is an example of the first vibrating system.

Also, the vibrating arrangement to include the vibrating body and the vibration-target object will be hereinafter referred to as a "second vibrating system." The vibrating system, composed of examples of the vibrating body (the magnet 134 and the holder 135 of the actuator 130) and examples of the vibration-target object (the top yoke 131, the bottom yoke 132, the drive coils 133, the springs 136, the screws 137 and the washers 137A of the actuator 130, the movable part 140, the electrostatic sensor 150, and the operating panel 160) is an example of the second vibrating system. In other words, the actuator 130, the movable part 140, the electrostatic sensor 150, and the operating panel 160 constitute an example of the second vibrating system.

The base 110 is made of resin, for example. The base 110 is a rectangular member in plan view, and a storage part 110A recessed from the upper side towards the lower side is formed. Also, the base 110 has a bottom plate 111, side walls 112, guides 113, step parts 114, and projecting parts 115.

The storage part 110A is a space surrounded by the bottom plate 111 and the side walls 112 of the base 110, and is shaped substantially like a rectangular parallelepiped. The storage part 110A houses the gap sensors 120, the actuator 130, and a lower part of the movable part 140. Of these, the gap sensors 120 are provided on the upper surface of the bottom plate 111.

The bottom plate 111 is a rectangular plate-like portion in plan view, and has an opening part 111A provided in the center, opening parts 111B provided at both end parts in the X direction, and opening parts 111C provided at both end parts in the Y direction. A lower end part of the actuator 130 is inserted in the opening part 111A. The actuator 130 and the bottom plate 111 are not in contact with each other and have a gap formed therebetween.

The lower ends of the movable part 140's guides 145 are inserted in the opening parts 111B. In the opening parts 111B, the guides 145 are not in contact with the bottom plate 111 and have a gap formed therebetween.

The side walls 112 are wall parts that are rectangular and annular in plan view and rise upward from the four sides of the bottom plate 111. The guides 113 are provided on the inner sides of the side walls 112 extending in the Y direction on both ±X-direction sides. Also, in the boundary portions between the inner sides of the side walls 112 and the bottom plate 111, the step parts 114 are provided, having upper surfaces located above the bottom plate 111 and below the upper surfaces 112A of the side walls 112. Also, in the upper surfaces 112A of the side walls 112, the projecting parts 115, protruding upward from the upper surfaces 112A, are provided.

With the tactile-sensation providing device 100 assembled, the guides 113 are inserted in the grooves 145A of the guides 145 of the movable part 140, and the lower ends of the guides 145 are inserted in the opening parts 111B. The guides 113 are provided for alignment of the base 110 and the movable part 140. With the tactile-sensation providing device 100 assembled, the guides 113 of the base 110 and the guides 145 of the movable part 140 do not butt up against each other and have a gap formed therebetween.

The step parts 114 are provided in a rectangular and annular shape in plan view, in the boundary portions between the bottom plate 111 and the side walls 112 in the storage part 110A. The rubber members 180L are provided on the upper surfaces of the step parts 114 (see FIG. 4 and FIG. 5). The rubber members 180L are small rectangular-parallelepiped members made of rubber, and are each a chunk of elastic rubber. Note that the rubber members 180L are by no means limited to being chunks of rubber, and may be formed by including, for example, springs. However, since it is not preferable for the rubber members 180L to produce sound themselves, it is then more preferable to form the rubber members 180L with rubber or the like, than form them by including metallic springs and the like.

FIG. 4 and FIG. 5 show eight rubber members 180L, for example. Two rubber members 180L are provided in each section corresponding to each side of the step parts 114 which are rectangular and annular. Note that, in FIG. 3, the rubber members 180L are omitted.

With the tactile-sensation providing device 100 assembled, the rubber members 180L are elastically deformed between the upper surfaces of the step parts 114 and the lower surface of the movable part 140, and support the movable part 140 against the base 110 elastically.

Also, in plan view, the rubber members 180U are provided above the same positions as where the rubber members 180L are provided (see FIG. 4 and FIG. 5). The rubber members 180U are small rectangular-parallelepiped members made of rubber, and are each a chunk of elastic rubber. Note that the rubber members 180U are by no means limited to being chunks of rubber, and may be formed by including, for example, springs. However, since it is not preferable for the rubber members 180U to produce sound themselves, it is then more preferable to form the rubber members 180U with rubber or the like, than form them by including metallic springs or the like. FIG. 4 shows the positions of eight rubber members 180U in a state in which the tactile-sensation providing device 100 is assembled.

With the tactile-sensation providing device 100 assembled, the rubber members 180U are provided being elastically deformed between the upper surface of the movable part 140 and an offset surface 172 of the bezel 170, and support between the bezel 170 and the movable part 140 elastically. In FIG. 4, the bezel 170 and the movable part 140 are omitted, and thus the rubber members 180U appear to be floating in mid-air.

The projecting parts 115 are wall-like portions that protrude upward from the upper surfaces 112A of the side walls 112, and are provided in a rectangular and annular shape on the upper surfaces 112A in plan view. The projecting parts 115 are thinner in width than the side walls 112 in plan view, and are provided on the inner sides of the upper surfaces 112A (on the side of the upper surfaces 112A facing the storage part 110A).

The rubber members 180S are provided on the inner surfaces of the projecting parts 115 extending in the Y direction on both ±X-direction sides (see FIG. 2, FIG. 4, and FIG. 5). The rubber members 180S are small rectangular-parallelepiped members made of rubber, and are each a chunk of elastic rubber. Note that the rubber members 180S are by no means limited to being chunks of rubber, and may be formed by including, for example, springs. However, since it is not preferable for the rubber members 180S to produce sound themselves, it is then more preferable to form the rubber members 180S with rubber or the like, than form them by including metallic springs or the like. In FIG. 4 and FIG. 5, for example, four rubber members 180S are provided on the inner surface of each projecting part 115 extending in the Y direction on both ±X-direction sides. Note that FIG. 3 omits the rubber members 180S.

With the tactile-sensation providing device 100 assembled, the rubber members 180S are provided being elastically deformed between the inner surfaces of the projecting parts 115 extending in the Y direction on both ±X-direction sides, and the side surfaces of the movable part 140 extending in the Y direction on both ±X-direction sides, and support the movable part 140 against the base 110 elastically. The rubber members 180S are provided in the gap between the base 110 and the movable part 140 in the X direction, thereby supporting the movable part 140 against the base 110 such that the movable part 140 is allowed to vibrate in the ±X directions.

The gap sensors 120 are examples of detection parts that detect pressing on the operating panel 160 in the −Z direction. The gap sensors 120 detect the gap with the lower surface of the movable part 140 in the Z direction. Each gap sensor 120 is, for example, an optical-type sensor having a built-in light source and a light receiving element, receives the reflected light of light radiated onto the lower surface of the movable part 140, and detects the change of position of the movable part 140 in the −Z direction, based on the change of position the reflected light's point of focus in the light receiving element. When the movable part 140 changes its position in the −Z direction, the electrostatic sensor 150 and the operating panel 160 also change their positions in the −Z direction, so that pressing on the electrostatic sensor 150 and the operating panel 160 in the −Z direction can be detected by detecting the change of position of the lower surface of the movable part 140 in the −Z direction. When the operating panel 160 is pressed in the −Z direction, the position of the movable part 140 changes by several tens of μm in the −Z direction.

The detection parts that detect pressing on the operating panel 160 in the −Z direction are by no means limited to the gap sensors 120. The detection parts may be non-contact position detection sensors such as electrostatic sensors. The detection parts may be pressure-sensitive sensors that detect the pressures applied to the upper surface of the operating panel 160.

The actuator 130 is fixed to the lower surface of the movable part 140 by screws 137. The lower surface of the movable part 140 is provided with a recess part that is recessed upward, and the actuator 130 is attached to the recess part. Note that the movable part 140 need not have a recess part, and the actuator 130 may be attached to the lower surface.

As shown in FIG. 6, the actuator 130 has the top yoke 131, the bottom yoke 132, the drive coils 133, the magnet 134, the holder 135, the springs 136, the screws 137, and the washers 137A. In FIG. 5, the top yoke 131 is hidden inside the recess part of the lower surface of the movable part 140.

The top yoke 131 is a magnetic body, and is a plate-like yoke to be attached to the recess part in the lower surface of the movable part 140. In the top yoke 131, through holes 131A, through which the screws 137 are inserted in the Z direction, are formed at both ends in the X direction.

The bottom yoke 132 is a magnetic body, and is a U-like yoke in XZ-plane view. The bottom yoke 132 is preferably the same magnetic body as the top yoke 131. Two drive coils 133 are fixed side by side in the X direction, in the portion of the bottom plate 132A of the bottom yoke 132. In the inner surface of each side wall 132B of the bottom yoke 132, a step part 132B1 is provided so that the thickness of the side wall 132 becomes thinner upwards in the X direction. The upper ends of the side walls 132B of the bottom yoke 132 are fixed to both end sides of the top yoke 131. By this means, the top yoke 131 and the bottom yoke 132 constitute a magnetic path that is like a closed loop in XZ-plane view.

Also, with the tactile-sensation providing device 100 assembled, the bottom plate 132A of the bottom yoke 132, which is located at the bottom of the components of the actuator 130, is inserted inside the opening part 111A of the bottom plate 111 of the base 110. In this state, the bottom yoke 132 is not in contact with the base 110. Consequently, the actuator 130 is spaced apart from the base 110. In other words, the base 110 is spaced apart from the actuator 130. This is to achieve a structure in which little vibration is transmitted to the base 110 when the actuator 130 vibrates.

The drive coils 133 are wound in the XY plane and fixed to the upper surface of the bottom plate 132A of the bottom yoke 132 by bonding, screwing, and so forth. When a clockwise current is applied to the drive coils 133 in plan view, a magnetic flux to penetrate through the center of the drive coils 133 downwards is produced. Also, when a counterclockwise current is applied to the drive coils 133 in plan view, a magnetic flux to penetrate through the center of the drive coils 133 upwards is produced.

The magnet 134 is a multi-pole magnetizing-type permanent magnet and has four poles (an N pole 134A, an S pole 134B, an N pole 134C, and an S pole 134D) arranged from the −X-direction side to the +X-direction side. The boundary between the N pole 134A and the S pole 134B is offset towards the +X direction, with respect to the center of the −X-side drive coil 133 in the X direction. Also, the boundary between the N pole 134C and the S pole 134D is offset towards the −X direction, with respect to the center of the +X-side drive coil 133 in the X direction.

The holder 135 is a member that is formed with a non-magnetic body and holds the magnet 134. Holding the magnet 134, the holder 135 is fixed to the step parts 132B1 of the side walls 132B of the bottom yoke 132, via the springs 136, screwing, and so forth.

The springs 136 hold the holder 135 against the bottom yoke 132 elastically, and can expand and contract in the X direction.

The screws 137 are provided in order to fix the top yoke 131 to the recess part in the lower surface of the movable part 140 and to the recess part of the lower surface of the movable part 140 via the washers 137A.

Given such an actuator 130, when a clockwise current is applied to the drive coils 133 in plan view, a magnetic flux to penetrate through the center of the drive coils 133 downwards is produced. Consequently, the upper end sides of the drive coils 133 become S poles and exert a magnetic attraction force on the N pole 134A and the N pole 134C, and a force in the +X direction acts on the magnet 134.

Also, when a counterclockwise current is applied to the drive coils 133 in plan view, a magnetic flux to penetrate through the center of the drive coils 133 upwards is produced. Consequently, the upper end sides of the drive coils 133 become N poles and exert a magnetic attraction force on the S pole 134B and the S pole 134D, and a force in the −X direction acts on the magnet 134.

By alternately applying a clockwise current and a counterclockwise current to the drive coils 133 in plan view, it is possible to make a force in the +X direction and a force in the −X direction act on the magnet 134 alternately. Also, the magnet 134 is attached to the bottom yoke 132, via the springs 136, together with the holder 135, and the springs 136 can expand and contract in the X direction.

It then follows that, by alternately applying a clockwise current and a counterclockwise current to the drive coils 133 in plan view, it is possible to make the magnet 134 and the holder 135 vibrate in the X direction with respect to the top yoke 131 and the bottom yoke 132.

The top yoke 131 of the actuator 130 is fixed to the lower surface of the movable part 140, and vibrates the movable part 140. The electrostatic sensor 150 and the operating panel 160 are mounted on the upper side of the movable part 140, and therefore the actuator 130 vibrates the vibration-target object, which is constituted by the movable part 140, the electrostatic sensor 150, and the operating panel 160.

The movable part 140 is made of resin, for example, and is a member having a rectangular and thin, plate-like shape in plan view. In the movable part 140, the actuator 130 is attached to the lower surface, and the electrostatic sensor 150 and the operating panel 160 are provided on the upper surface, in this order.

Also, the rubber members 180S are provided, in a compressed state, between both side surfaces of the movable part 140 in the X direction and the inner surfaces of the projecting parts 115 of the base 110 on both ±X-direction sides. As for the side surfaces that run along the four sides of the movable part 140 in plan view, only the side surfaces on both ±X-direction sides are in contact with the base 110 via the rubber members 180S alone.

Also, the rubber members 180L are provided between the end parts along the four sides of the lower surface of the movable part 140 and the step parts 114 of the base 110. Consequently, the lower surface of the movable part 140 is in contact with the base 110 only through the rubber member 180L.

Also, the rubber members 180U are provided between the end parts along the four sides of the upper surface of the movable part 140 and the offset surface 172 of the bezel 170. Consequently, the upper surface of the movable part 140 is in contact with the bezel 170 only through the rubber member 180U.

Note that the guides 113 are inserted in the grooves 145A of the guides 145 of the movable part 140 for alignment with the base 110, and the lower ends of the guides 145 are inserted in the opening parts 110B of the base 110, but the guides 145 and the guides 113 are not in contact with each other.

Consequently, the movable part 140 is in contact with the base 110 and the bezel 170 only via the rubber members 180S, 180L, and 180U. That is, the base 110 is elastically connected with the movable part 140.

The electrostatic sensor 150 is fixed on the upper surface of the movable part 140. The upper surface and the side surfaces of the electrostatic sensor 150 are covered by the operating panel 160, and the operating panel 160 is fixed to the movable part 140 by screwing or the like, thereby fixing the electrostatic sensor 150 on the upper surface of the movable part 140.

A touch pad is an example of the electrostatic sensor 150, which detects whether or not the operating panel 160 is operated by using an operating medium, and detects the position where the operation is performed, based on the change in capacitance. The operating medium is, for example, a living body's finger or hand, or a tool such as a stylus pen.

As for the operation on the operating panel 160, there are cases where the operating panel 160 is directly operated by using an operating medium, and cases where a cover or the like is additionally provided on top of the operating panel 160 and the operating panel 160 is operated indirectly via the cover or the like.

The operating panel 160 is a resin panel having a rectangular shape in plan view, and is provided so as to cover the upper surface and the side surfaces of the electrostatic sensor 150. The electrostatic sensor 150 detects the operations via the operating panel 160. For doing this, the operating panel 160 is non-metallic, and, for example, made of resin.

The bezel 170 is a frame-like member that is rectangular and annular in plan view, and, as shown in FIG. 2, has a cross-section shaped like the letter L. The bezel 170 has a lower surface 171 and an offset surface 172. The offset surface 172 is offset inward and upward with respect to the lower surface 171. The lower surface 171 and the offset surface 172 are both rectangular annular surfaces when viewed from the −Z-direction side.

The bezel 170 is attached to the upper surfaces 112A of the side walls 112 of the base 110 in a state in which the offset surface 172 is abutted against the upper surfaces 112A via rubber members (not shown), keeping a distance from the operating panel 160 and surrounding the operating panel 160. The bezel 170 is spaced apart from the operating panel 160, and thus is not in contact with the operating panel 160. Also, the bezel 170 is not in contact with the movable part 140 either.

The bezel 170 is fixed to the base 110 by the screws 175 in a state in which the offset surface 172 is abutted against the upper surfaces 112A of the side walls 112 of the base 110. In FIG. 3, for example, the four corners of the base 110 and the bezel 170 are fixed by using four screws 175, but they may be fixed with more screws 175 or with fewer screws 175.

This tactile-sensation providing device 100 is designed so that, as a condition (1), the resonance frequency of the first vibrating system is ⅔ or less of the resonance frequency of the second vibrating system. This is to reduce the vibration that is transmitted to the base 110 when the actuator 130 vibrates, while allowing the vibration-target object to be vibrated sufficiently.

Also, in order to increase this effect, a condition (2) may be set forth that the mass of the vibrating body be set to be less than or equal to the mass of the vibration-target object.

Also, a condition (3) may be set forth that the resonance frequency of the first vibrating system be set to 50 Hz or above. Considering, for example, that the tactile-sensation providing device 100 may be mounted on a vehicle, it is well known that a travelling vehicle produces road noise (vibration) mainly around the frequency of 50 Hz or below. So, when, for example, the tactile-sensation providing device 100 is mounted on a vehicle by attaching the base 110 to the center console or somewhere in the vehicle's interior, the resonance frequency of the first vibrating system is set to 50 Hz or above, to prevent the road noise from being transmitted and added to the vibration of the vibration-target object of the first vibrating system. This is, in other words, to prevent the vibration of the first vibrating system from being affected by the vehicle's vibration due to the road noise.

Also, a condition (4) may be set forth that the resonance frequency of the second vibrating system be set in a range of 80 Hz or above to 320 Hz or below. This is because human sensory organs are able to perceive vibration best in the frequency band of 80 Hz to 320 Hz.

Also, a condition (5) may be set forth that the vibration-target object be vibrated in the X direction, and the first vibrating system and the second vibrating system be each made a vibrating system that vibrates along the X direction. The X direction is an example of a predetermined direction.

Also, a condition (6) may be set forth that the resonance frequency of the first vibrating system be set to ⅓ or less of the resonance frequency of the second vibrating system. This is a condition for setting the resonance frequency of the first vibrating system in a more preferable range than condition (1). This is, furthermore, a condition set forth in order to more effectively reduce the vibration that is transmitted to the base 110 when the actuator 130 vibrates, while allowing the vibration-target object to be vibrated more effectively.

Also, a condition (7) may be set forth that the quality factor (Q factor) represented by following equation (1), using spring constant K and viscosity loss C of the first vibrating system and mass M of the vibration-target object, be set to 1 or greater and 10 or less:

$$Q=(MK)^{1/2}/C \quad \text{(Equation 1)}$$

Figure 7:
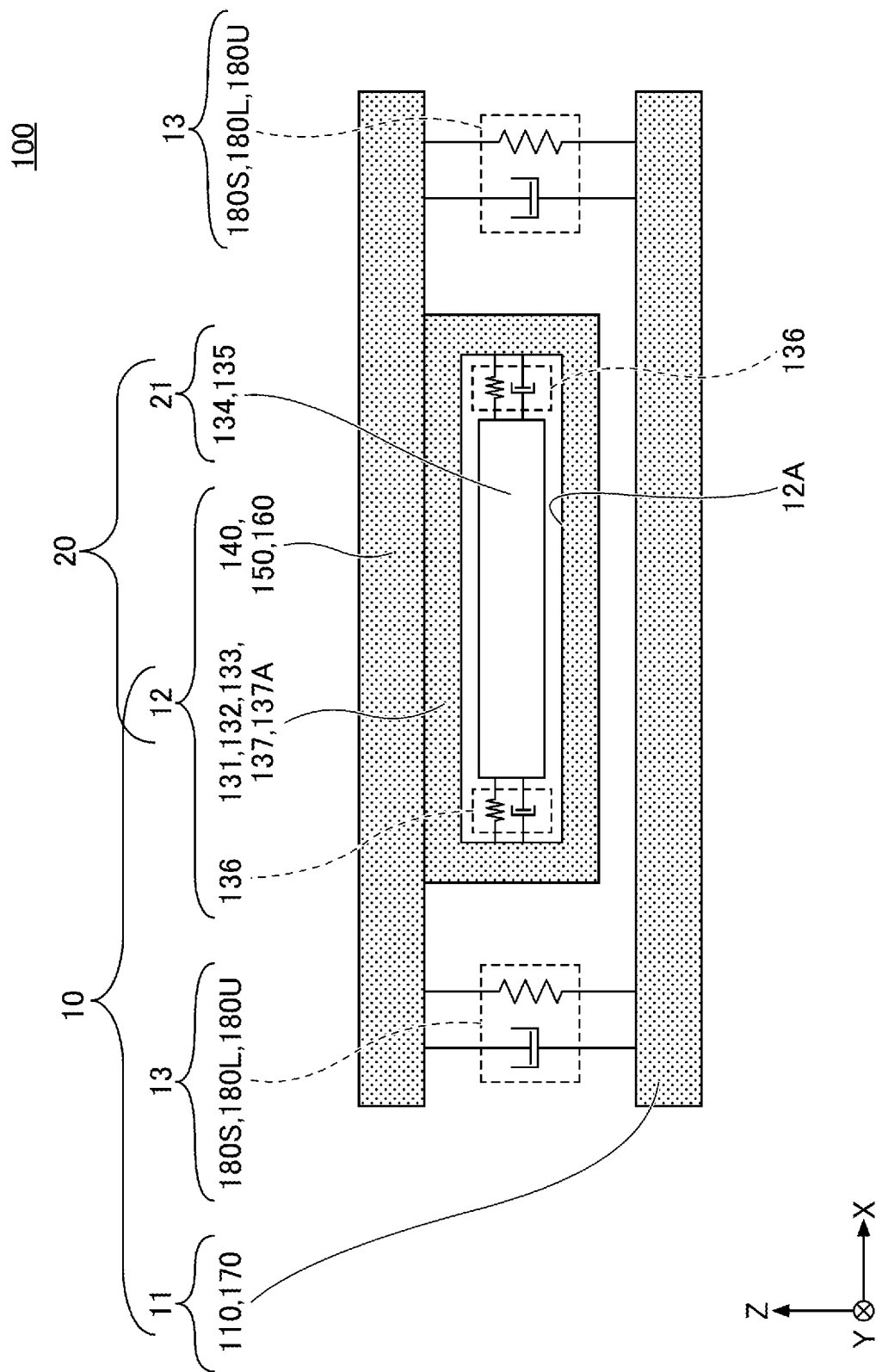
FIG. 7 is a diagram that illustrates, schematically, the structure of the tactile-sensation providing device 100.

FIG. 7 is a diagram that illustrates, schematically, the structure of the tactile-sensation providing device 100. The first vibrating system 10 here includes the base part 11, the vibration-target object 12, and the elastic body 13. The vibration-target object 12 is connected with the base part 11 via the elastic body 13. This base part 11 is composed of, for example, the base 110 and the bezel 170. Here, the base part 11 is shown as one plate-like member. The vibration-target object 12 is composed of, for example, the top yoke 131, the bottom yoke 132, the drive coils 133, the springs 136, the screws 137, the washers 137A, the movable part 140, the electrostatic sensor 150, and the operating panel 160. Here, in the vibration-target object 12, the top yoke 131, the bottom yoke 132, the drive coils 133, the screws 137, and the washers 137A are shown collectively as a frame-like member, having the opening part 12A in the center, in XZ-plane view. The springs 136 of the vibration-target object 12 are each shown as a pair of a coil and a damper. Also, the movable part 140, the electrostatic sensor 150, and the operating panel 160 of the vibration-target object 12 are shown as a plate-like member. A frame-like member including the top yoke 131, the bottom yoke 132, the drive coils 133, the screws 137, and the washers 137A is fixed under the plate-like member including the movable part 140, the electrostatic sensor 150, and the operating panel 160. The elastic body 13 connects between the base part 11 and the vibration-target object 12 elastically, and includes, for example, the rubber members 180S, 180L, and 180U. Here, the rubber members 180S, 180L, and 180U are each shown as a pair of a coil and a damper.

Also, the second vibrating system 20 includes a vibrating body 21 and a vibration-target object 12. The vibrating body 21 here is composed of, for example, the magnet 134 and the holder 135. Here, the vibrating body 21 is shown as one member, and the vibrating body 21 is shown to be held by the springs 136 in the opening part 12A of the vibration-target object 12. The vibration-target object 12 is composed of, for example, the top yoke 131, the bottom yoke 132, the drive coils 133, the springs 136, the screws 137, the washers 137A, the movable part 140, the electrostatic sensor 150, and the operating panel 160, and the second vibrating system 20 is therefore composed of the actuator 130, the movable part 140, the electrostatic sensor 150, and the operating panel 160 (see, for example, FIG. 6).

When a clockwise current is applied to the drive coils 133 in plan view, as described earlier, a force in the +X direction acts on the magnet 134. When a counterclockwise current is applied to the drive coils 133 in plan view, as described earlier, a force in the −X direction acts on the magnet 134. By alternately applying a clockwise current and a counterclockwise current to the drive coils 133, forces in the +X and −X directions act alternately on the magnet 134, so that it is possible to make the vibration-target object 12 vibrate in the ±X directions.

Figure 8A:
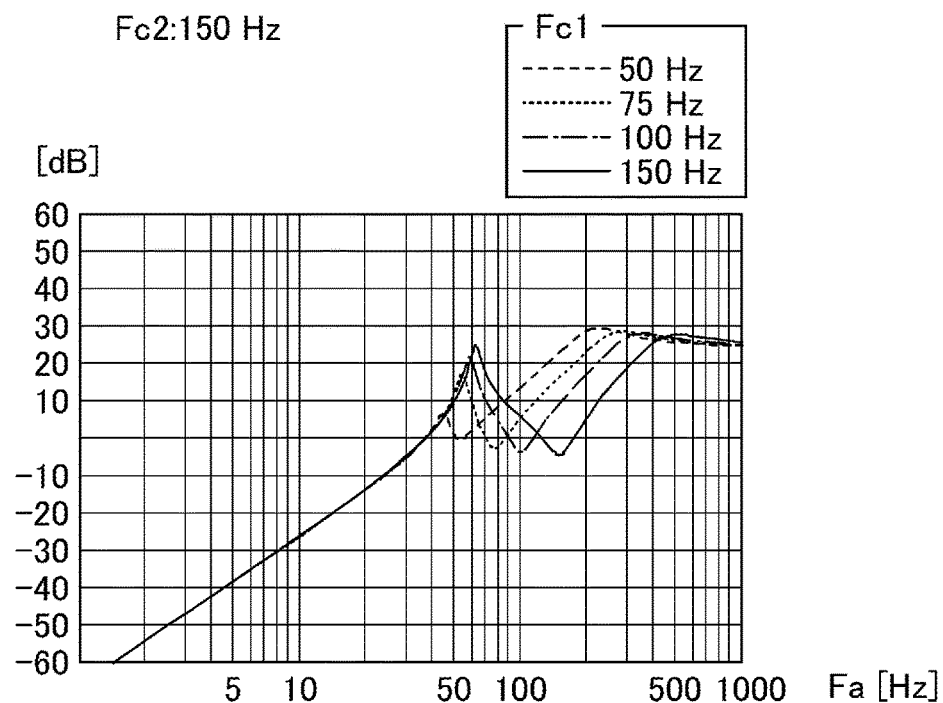
FIG. 8A is a diagram that illustrates the respective relationships between the vibration frequency and the acceleration in the vibration-target object and the base part.
Figure 8B:
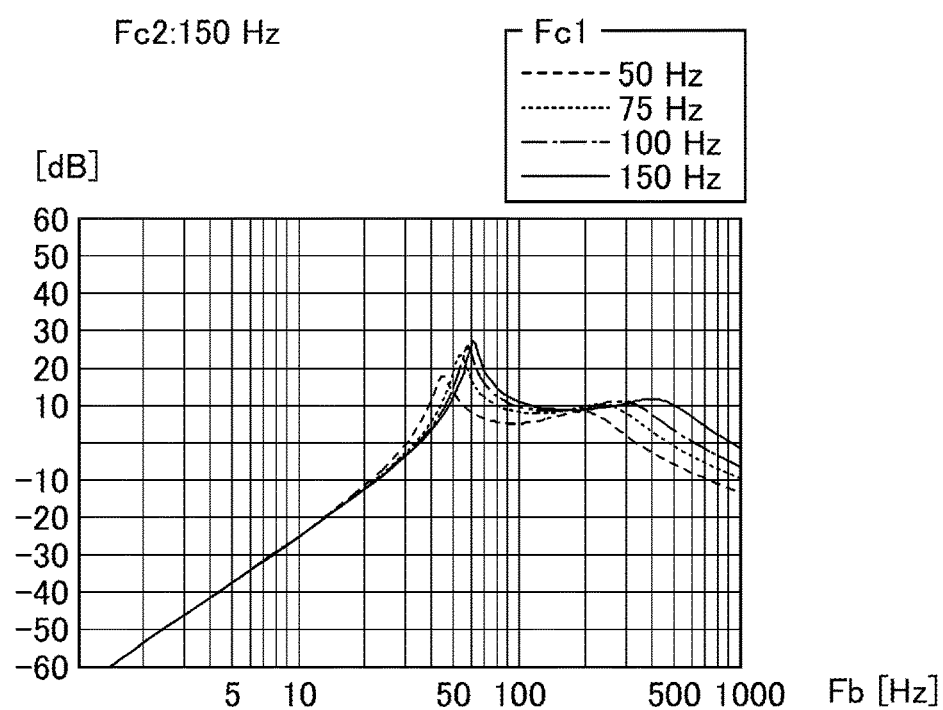
FIG. 8B is a diagram that illustrates the respective relationships between the vibration frequency and the acceleration in the vibration-target object and the base part.

FIGS. 8A and 8B are diagrams that each illustrate the respective relationships between the vibration frequency and the acceleration in the vibration-target object and the base part. FIG. 8A shows the acceleration of the vibration-target object with respect to vibration frequency Fa of the vibration-target object. FIG. 8B shows the acceleration of the base part with respect to vibration frequency Fb of the base part. Vibration frequency Fa of the vibration-target object is the frequency at which the vibration-target object vibrates in the X direction. Also, vibration frequency Fb of the base part is the frequency at which the base part vibrates in the X direction.

The characteristics shown in FIGS. 8A and 8B are obtained, in a simulation, by setting resonance frequency Fc1 of the first vibrating system to four resonance frequencies, namely 50 Hz, 75 Hz, 100 Hz, and 150 Hz, and by setting resonance frequency Fc2 of the second vibrating system to 150 Hz. That is, when resonance frequency Fc1 of the first vibrating system is 50 Hz, 75 Hz, 100 Hz, and 150 Hz, these are ⅓, ½, ⅔, and whole of resonance frequency Fc2 of the second vibrating system, respectively. FIGS. 8A and 8B show simulation results in which the mass of the vibrating body is 0.06 kg, the mass of the vibration-target object is 0.4 kg, and the mass of the base part is 1 kg.

Setting resonance frequency Fc1 of the first vibrating system to predetermined frequencies such as, for example, four frequencies of 50 Hz, 75 Hz, 100 Hz, and 150 Hz, is made possible mainly by setting the spring constant of the elastic bodies (for example, the rubber members 180S, 180L, and 180U) that elastically connect between the vibration-target object and the base part included in the first vibrating system. Also, given that the vibration direction of the first vibrating system is the X-axis direction, resonance frequency Fc1 of the first vibrating system is mainly determined by the spring constant of the rubber members 180S, which easily deform elastically in the X direction among the rubber members 180S, 180L, and 180U. This is because the rubber members 180L and 180U are deformed in shear directions with respect to the X direction, and their spring constants in the X direction are about ¹⁄₁₀ of the spring constant of the rubber member 180S in the X direction. Also, strictly speaking, the vibration-target object and the base part (for example, the movable part 140, the electrostatic sensor 150, and the operating panel 160) included in the first vibrating system also have levels of elasticity, but these are negligible compared to the elasticity of the rubber members 180S, 180L, and 180U.

Also, setting resonance frequency Fc2 of the second vibrating system to a predetermined frequency such as 150 Hz is mainly made possible by setting the vibration characteristics of the actuator 130, and setting the size, Young's modulus, and so forth of the movable part 140, the electrostatic sensor 150, and the operating panel 160.

In the characteristics illustrated in FIG. 8A, the acceleration of the vibration-target object assumes a maximal value when vibration frequency Fa is 40 Hz or above and 65 Hz or below, assumes a minimal value at 50 Hz or above and 160 Hz or below, assumes a second maximal value (peak) of approximately 30 dB at 200 Hz or above and 500 Hz or below, and decreases gradually at still higher frequencies. According to this vibration-target object's acceleration, when vibration frequency Fa has higher frequencies than the peak, the decrease compared to the peak is kept to approximately 6 dB to 8 dB, and the changes of the vibration-target object's acceleration in response to the changes of vibration frequency Fa are relatively insignificant, so that it is possible to achieve a design whereby the vibration-target object can be vibrated sufficiently, and at a desired intensity. That is, the range from around the peak of vibration frequency Fa to higher frequencies is a frequency band suitable for vibrating the vibration-target object. Also, as resonance frequency Fc1 is increased from 50 Hz to 75 Hz, to 100 Hz, and then to 150 Hz, the frequencies at which vibration frequency Fa has the maximal value, the minimal value, and then the peak value tend to shift to higher frequencies.

Human sensory organs perceive vibration well in the frequency band of 80 Hz to 500 Hz, and perceive vibration even better in the frequency band of 80 Hz to 320 Hz. A vibration pattern in which resonance frequency Fc1 is 150 Hz is not preferable because the minimal value occurs at about 150 Hz, and it is difficult to vibrate the vibration-target object in the frequency band which human sensory organs perceive well. On the other hand, a vibration pattern in which, as resonance frequency Fc1 decreases from 100 Hz, to 75 Hz, and then to 50 Hz in order, the minimal value of vibration frequency Fa also decreases towards 80 Hz or below, is more preferable because it is easy to vibrate the vibration-target object in the frequency band which human sensory organs perceive well. Also, as resonance frequency Fc1 becomes smaller, the peak of vibration frequency Fa decreases in the range of 500 Hz or below, so that it is possible to make use of a wider frequency band in the range from around the peak, which is suitable to vibrate the vibration target object, to higher frequencies. In other words, from the perspective of allowing the vibration-target object to vibrate effectively, resonance frequency Fc1 is preferably 100 Hz or below, more preferably 75 Hz or below, and even more preferably 50 Hz or below.

Also, the acceleration of the base part shows the characteristics shown in FIG. 8B, in which the acceleration of the base part assumes a maximal value when vibration frequency Fb of the base part is 40 Hz or above and 65 Hz or below, assumes a minimal value when vibration frequency Fb at 90 Hz or above and 200 Hz or below, assumes a second maximal value of about 10 dB when vibration frequency Fb at 200 Hz or above and 500 Hz or below, and decreases gradually at still higher frequencies. The acceleration of the base part when resonance frequency Fc1 is 50 Hz, 75 Hz, and 100 Hz is 10 dB or less, if vibration frequency Fb is 80 Hz or above and 500 Hz or below.

It is therefore made clear that the vibration intensity of the base part attenuates by about 20 dB in comparison to the vibration intensity of the vibration-target object, in the frequency band of 80 Hz to 500 Hz, which human sensory organs perceive well. That is, it is made clear that the vibration of the base part attenuates when resonance frequency Fc2 of the second vibrating system is 150 Hz and resonance frequency Fc1 of the first vibrating system is 50 Hz, 75 Hz and 100 Hz.

Also, as shown in FIG. 8B, it is found out that, in the frequency band of 80 Hz to 500 Hz, which human sensory organs perceive well, as resonance frequency Fc1 of the first vibrating system becomes smaller, the vibration intensity of the base part decreases. In other words, from the perspective of reducing the transmission of vibration to the base part, resonance frequency Fc1 is preferably 100 Hz or below, more preferably 75 Hz or below, and even more preferably 50 Hz or below.

From the above, in accordance with above as condition (1), it is made clear that, by setting resonance frequency Fc1 of the first vibrating system to be ⅔ or less of resonance frequency Fc2 of the second vibrating system, that is, by setting resonance frequency Fc1 of the first vibrating system to 100 Hz or below, when the actuator 130 is driven to vibrate the vibrating body, it is possible to reduce the vibration that is transmitted to the base part, while allowing the vibration-target object to be vibrated sufficiently.

Also, it is found out that, by setting resonance frequency Fc1 of the first vibrating system to be ½ or less of resonance frequency Fc2 of the second vibrating system, that is, by setting resonance frequency Fc1 of the first vibrating system to 75 Hz or below, it is possible to reduce the vibration that is transmitted to the base part more effectively, while allowing the vibration-target object to be vibrated more effectively. Furthermore, in accordance with above condition (6), it is made clear that, by setting resonance frequency Fc1 of the first vibrating system to be ⅓ or less of resonance frequency Fc2 of the second vibrating system, that is, by setting resonance frequency Fc1 of the first vibrating system to 50 Hz or below, it is possible to reduce the vibration that is transmitted to the base part even more effectively, while allowing the vibration-target object to be vibrated more effectively.

Furthermore, human sensory organs can perceive vibration in the frequency band of 80 Hz to 500 Hz, and perceive vibration best in the frequency band of 80 Hz to 320 Hz. It then follows that resonance frequency Fc2 of the second vibrating system has only to be set in the range of 80 Hz or above and 500 Hz or below, but, in accordance with above condition (4), it is more preferable to set resonance frequency Fc2 of the second vibrating system in the range of 80 Hz or above and 320 Hz or below.

Also, the tactile-sensation providing device 100 has a vibrating system in which the vibration-target object is vibrated in the X direction, and in which the first vibrating system and the second vibrating system vibrate along the X direction. This is as mentioned earlier as condition (5). Since the actuator 130 has the drive coils 133 and the magnet 134 arranged as shown in FIG. 6, it is possible to easily achieve a structure in which the vibration-target object is vibrated in the X direction, and in which the first vibrating system and the second vibrating system vibrate along the X direction.

Figure 9:
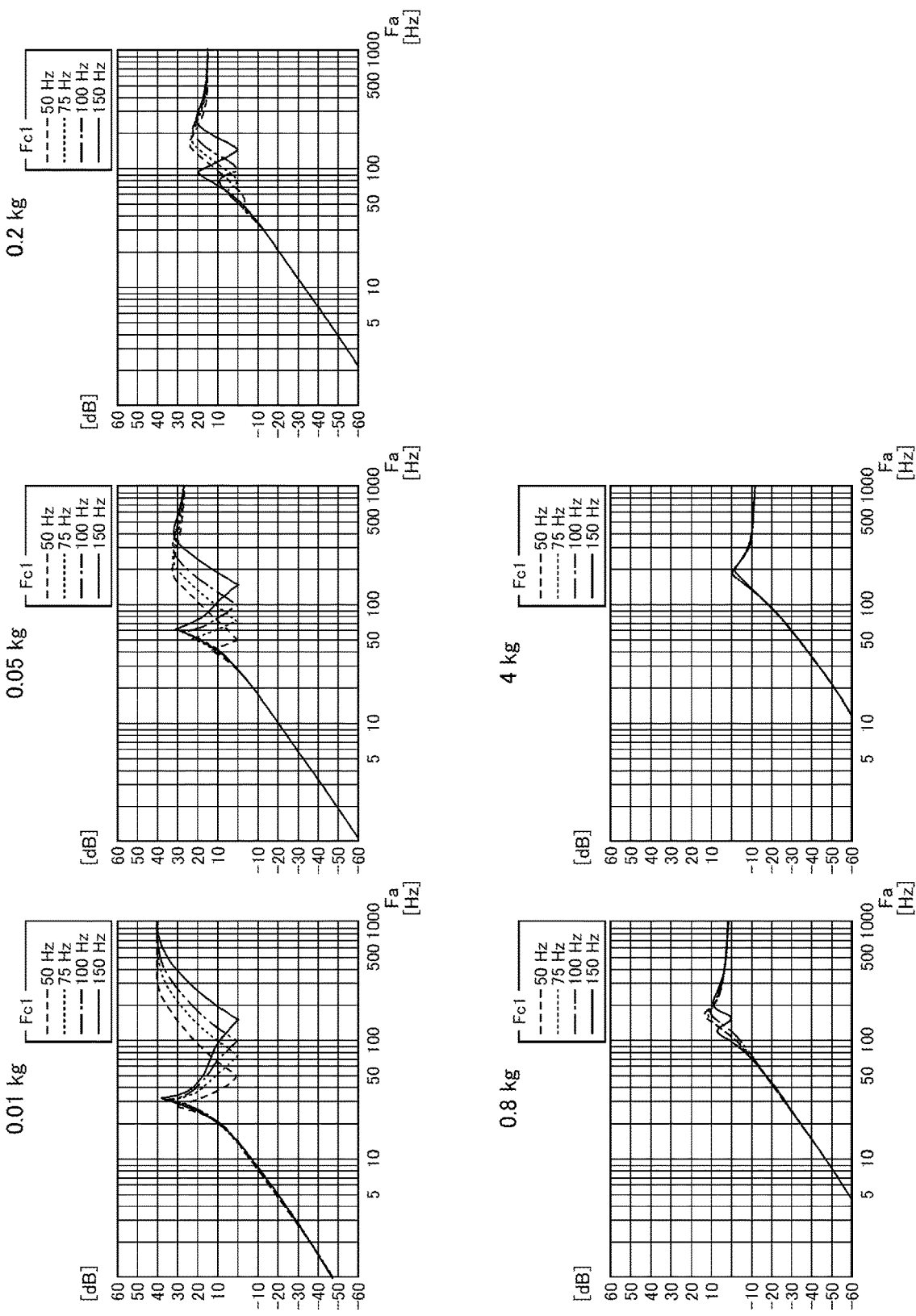
FIG. 9 is a diagram that illustrates the relationship between the vibration frequency and the acceleration of the vibration-target object when the mass of the vibrating body is changed.
Figure 10:
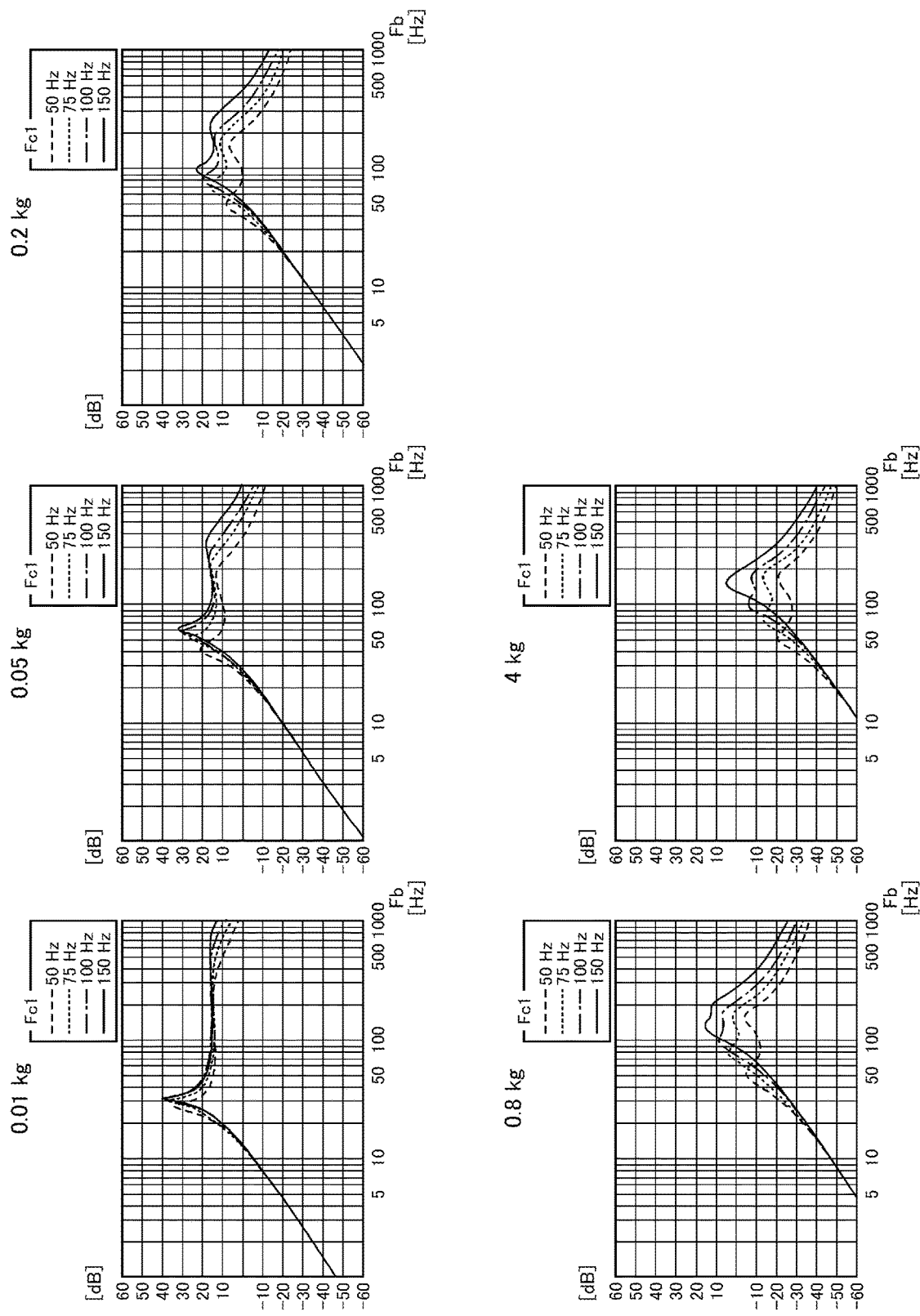
FIG. 10 is a diagram that illustrates the relationship between the vibration frequency and the acceleration of the base part when the mass of the vibrating body is changed.

FIG. 9 is a diagram that illustrates the relationship between vibration frequency Fa and the acceleration of the vibration-target object when the mass of the vibrating body is changed. FIG. 10 is a diagram that illustrates the relationship between vibration frequency Fb and the acceleration of the base part when the mass of the vibrating body is changed. The characteristics shown in FIG. 9 and FIG. 10 are obtained, in simulations, by setting resonance frequency Fc1 of the first vibrating system to four resonance frequencies, namely 50 Hz, 75 Hz, 100 Hz, and 150 Hz, and by setting resonance frequency Fc2 of the second vibrating system to 150 Hz.

FIG. 9 and FIG. 10 show five respective simulation results, obtained by increasing the mass of the vibrating body stepwise from 0.01 kg to 0.05 kg, to 0.2 kg, to 0.8 kg, and then to 4 kg. Note that the mass of the base part is set to 10 kg assuming that the tactile-sensation providing device 100 is mounted in a vehicle, and the mass of the vibration-target object is set to 0.2 kg.

As shown in FIG. 9, when the mass of the vibrating body is increased stepwise from 0.01 kg to 0.05 kg, to 0.2 kg, to 0.8 kg, and then to 4 kg, the vibration-target object's acceleration changes following changes of resonance frequency Fc1 of the first vibrating system only when the mass of the vibrating body is 0.2 kg, and changes little when the mass of the vibrating body is 0.8 kg and 4 kg. This indicates that, when the mass of the vibrating body exceeds 0.2 kg, that is, when the mass of the vibrating body exceeds the mass of the vibration-target object, influence of the spring constant of the elastic bodies (the rubber members 180S, 180L, and 180U) connecting between the base part and the vibration-target object, which is the main factor in determining resonance frequency Fc1 of the first vibrating system, is unlikely.

Also, as the mass of the vibrating body increases, the acceleration of the vibration-target object decreases on the whole, regardless of vibration frequency Fa. This is likely to be because the larger the mass of the vibrating body is with respect to the mass of the vibration-target object, the greater the energy that is accumulated in the vibrating body is with respect to the energy that is accumulated in the vibration-target object.

Therefore, from the perspective of allowing the vibration-target object to vibrate effectively, it is preferable if the mass of the vibrating body is small compared to the mass of the vibration-target object, and it is particularly preferable if the mass of the vibrating body is less than or equal to the mass of the vibration-target object.

As shown in FIG. 10, when the mass of the vibrating body is increased stepwise from 0.01 kg to 0.05 kg, to 0.2 kg, to 0.8 kg, and then to 4 kg, it is clear that, in all cases of these masses, the acceleration of the base part changes following changes of resonance frequency Fc1 of the first vibrating system. Also, as for the band of 80 Hz to 500 Hz, it is made clear that the acceleration of the base part shown in FIG. 10 is sufficiently reduced with respect to the acceleration of the vibration-target object shown in FIG. 9. Consequently, in terms of the relationship to the base 110's vibration frequency Fb and acceleration, it is made clear that the mass of the vibrating body can be set to any of 0.01 kg, 0.05 kg, 0.2 kg, 0.8 kg and 4 kg.

Therefore, as FIG. 9 and FIG. 10 make clear, in accordance with condition (2), it is preferable if the mass of the vibrating body is less than or equal to the mass of the vibration-target object.

Figure 11A:
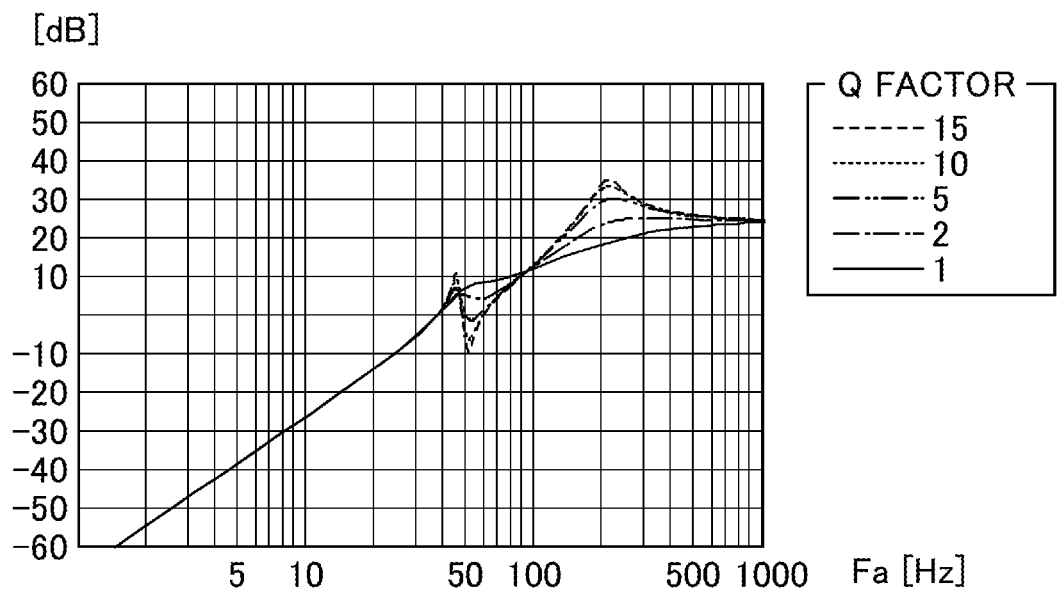
FIG. 11A is a diagram that illustrates the respective vibration frequency-vs-acceleration characteristics in the vibration-target object and the base part.
Figure 11B:
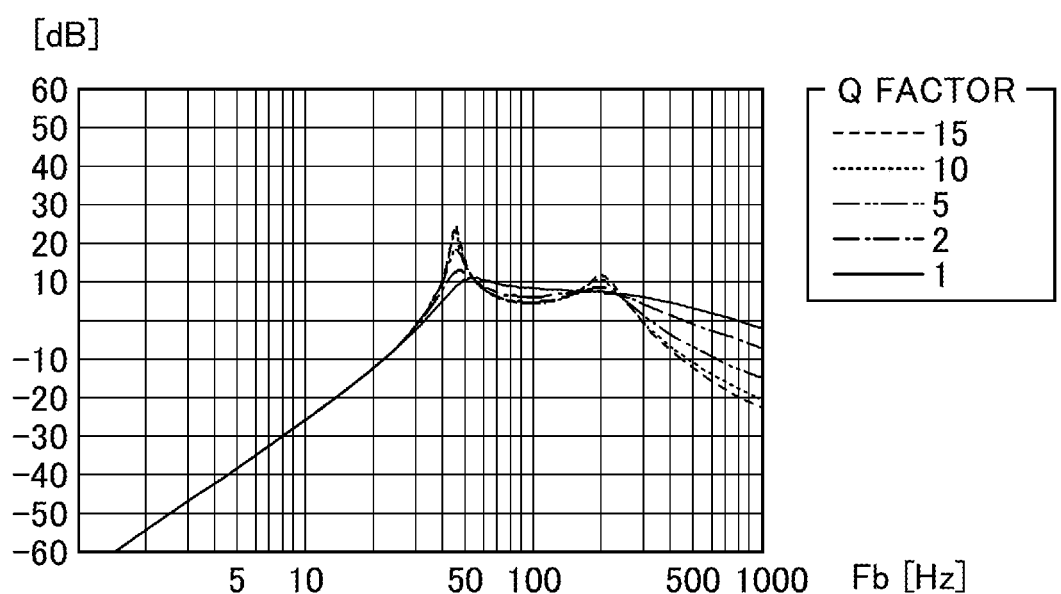
FIG. 11B is a diagram that illustrates the respective vibration frequency-vs-acceleration characteristics in the vibration-target object and the base part.

FIGS. 11A and 11B are diagrams that illustrate the respective vibration frequency-vs-acceleration characteristics of the vibration-target object and the base part. FIGS. 11A and 11B illustrate multiple characteristics obtained by changing the Q factor of the first vibrating system stepwise from 15 to 10, to 5, to 2, and then to 1. Also, the characteristics shown in FIGS. 11A and 11B are obtained in simulations by setting resonance frequency Fc1 of the first vibrating system to 50 Hz and setting resonance frequency Fc2 of the second vibrating system to 150 Hz.

Using spring constant K, viscosity loss C, and mass M of the vibration-target object in the first vibrating system, the Q factor of the first vibrating system can be represented by following equation (1):

$$Q=(MK)^{1/2}/C \qquad \text{(Equation 1)}$$

FIG. 11A shows vibration frequency Fa-vs-acceleration characteristics of the vibration-target object. FIG. 11A makes clear the tendency that, when the Q factor is changed stepwise from 15 to 10, to 5, to 2, and then to 1, larger Q factors achieve greater acceleration. Also, it is clear that, there is almost no difference in acceleration when the Q factor is 15 and 10. These tendencies are particularly obvious in the range of 80 Hz to 500 Hz, which human sensory organs perceive well. Therefore, it is made clear that larger Q factors are preferable from the perspective of the vibration-target object's vibration frequency Fa-vs-acceleration characteristics, that Q factors larger than 10 cease to provide greater effect, and that the vibration-target object can be vibrated sufficiently even when the Q factor is 1.

FIG. 11B shows the vibration Fb-vs-acceleration characteristics of the base part. FIG. 11B makes clear the tendency that, when the Q factor is changed stepwise from 15 to 10, to 5, to 2, and then to 1, the greater the Q factor, the more the base part's acceleration is reduced. This tendency is particularly obvious in the range of 80 Hz to 500 Hz, which human sensory organs perceive well. However, it is found out that, in the band of 50 Hz or below, which is more prone to be affected by road noise, a maximal value to provide high acceleration occurs when the Q factor is 15. Also, it is found out that, in the range of 80 Hz to 500 Hz, the acceleration of the base part shown in FIG. 11B is sufficiently reduced with respect to the acceleration of the vibration-target object shown in FIG. 11A. Therefore, while it is preferable to make the Q factor large within the range of 10 or less from the perspective of the base part's vibration Fb-vs-acceleration characteristics, it is nevertheless found out that the vibration of the base part can be reduced even when the Q factor is 1.

As described above, as mentioned earlier as condition (7), the results of FIGS. 11A and 11B make it clear that the Q factor of the first vibrating system is preferably 1 or greater, and 10 or less.

As described above, by setting resonance frequency Fc1 of the first vibrating system to be ⅔ or less of resonance frequency Fc2 of the second vibrating system, it is possible to achieve a structure in which little vibration is transmitted to the base part, while allowing the vibration-target object to be vibrated sufficiently.

Therefore, it is possible to provide a tactile-sensation providing device 100 that reduces the transmission of vibration to the base part, while allowing the vibration-target object to be vibrated sufficiently.

Note that, although an example of using an electrostatic sensor 150 has been described above, it is equally possible to use a touch panel through which light can transmit, instead of the electrostatic sensor 150, and, furthermore, provide a display panel on top of the touch panel, and press and operate the GUIs (Graphical User Interfaces) displayed on the display panel.

Also, although vibration frequency Fb and the acceleration of the vibration-target object and/or the base part when resonance frequency Fc2 of the second vibrating system is set to 150 Hz have been described above with reference to FIG. 8A to FIG. 11B, the same is true for cases in which resonance frequency Fc2 is not 150 Hz.

Also, although cases have been described in the above in which the vibration direction of the actuator 130 is the X direction, the vibration direction of the actuator 130 is by no means limited to the X direction. For example, the vibration direction of the actuator 130 may be the Z direction or any other direction.

Although the tactile-sensation providing device according to an example embodiment of the present invention has been described above, the present invention is by no means limited to the embodiment specifically disclosed herein, and a variety of alterations and changes are possible without departing from the scope of the following claims.

What is claimed is:

1. A tactile-sensation providing device comprising:
a vibrating body;
a vibration-target object that is elastically connected with the vibrating body and vibrated in accordance with vibration of the vibrating body; and
a base part that is elastically connected with the vibration-target object,
the tactile-sensation providing device providing a tactile sensation to a living body based on vibration of the vibration-target object,
wherein the base part is spaced apart from the vibrating body,
wherein a resonance frequency of a first vibrating system including the base part and the vibration-target object is ⅔ or less of a resonance frequency of a second vibrating system including the vibration-target object and the vibrating body, and
wherein a mass of the vibrating body is less than or equal to a mass of the vibration-target object.

2. The tactile-sensation providing device according to claim 1, wherein the resonance frequency of the first vibrating system is 50 Hz or above.

3. The tactile-sensation providing device according to claim 1, wherein the resonance frequency of the second vibrating system is 80 Hz or above and 320 Hz or below.

4. The tactile-sensation providing device according to claim 1,
wherein the vibration-target object is vibrated in directions including a predetermined direction, and
wherein the first vibrating system and the second vibrating system vibrate along the predetermined direction.

5. The tactile-sensation providing device according to claim 1, wherein the resonance frequency of the first vibrating system is ⅓ or less of the resonance frequency of the second vibrating system.

6. The tactile-sensation providing device according to claim 1, wherein the resonance frequency of the first vibrating system is ⅓ or less of the resonance frequency of the second vibrating system.

7. The tactile-sensation providing device according to claim 2, wherein the resonance frequency of the first vibrating system is ⅓ or less of the resonance frequency of the second vibrating system.

8. The tactile-sensation providing device according to claim 3, wherein the resonance frequency of the first vibrating system is ⅓ or less of the resonance frequency of the second vibrating system.

9. The tactile-sensation providing device according to claim 4, wherein the resonance frequency of the first vibrating system is ⅓ or less of the resonance frequency of the second vibrating system.

10. The tactile-sensation providing device according to claim 1, wherein, using a spring constant K and a viscosity loss C in the first vibrating system, and a mass M of the vibration-target object, a Q factor, represented by following equation (1), is 1 or more and 10 or less:

$$Q=(MK)^{1/2}/C \quad \text{(Equation 1)}.$$

11. The tactile-sensation providing device according to claim 1, wherein, using a spring constant K and a viscosity loss C in the first vibrating system, and a mass M of the vibration-target object, a Q factor, represented by following equation (1), is 1 or more and 10 or less:

$$Q=(MK)^{1/2}/C \quad \text{(Equation 1)}.$$

12. The tactile-sensation providing device according to claim 2, wherein, using a spring constant K and a viscosity loss C in the first vibrating system, and a mass M of the vibration-target object, a Q factor, represented by following equation (1), is 1 or more and 10 or less:

$$Q=(MK)^{1/2}/C \quad \text{(Equation 1)}.$$

13. The tactile-sensation providing device according to claim 3, wherein, using a spring constant K and a viscosity loss C in the first vibrating system, and a mass M of the vibration-target object, a Q factor, represented by following equation (1), is 1 or more and 10 or less:

$$Q=(MK)^{1/2}/C \quad \text{(Equation 1)}.$$

14. The tactile-sensation providing device according to claim 4, wherein, using a spring constant K and a viscosity loss C in the first vibrating system, and a mass M of the vibration-target object, a Q factor, represented by following equation (1), is 1 or more and 10 or less:

$$Q=(MK)^{1/2}/C \quad \text{(Equation 1)}.$$

15. The tactile-sensation providing device according to claim 5, wherein, using a spring constant K and a viscosity loss C in the first vibrating system, and a mass M of the vibration-target object, a Q factor, represented by following equation (1), is 1 or more and 10 or less:

$$Q=(MK)^{1/2}/C \quad \text{(Equation 1)}.$$

16. The tactile-sensation providing device according to claim 6, wherein, using a spring constant K and a viscosity loss C in the first vibrating system, and a mass M of the vibration-target object, a Q factor, represented by following equation (1), is 1 or more and 10 or less:

$$Q=(MK)^{1/2}/C \quad \text{(Equation 1)}.$$

17. The tactile-sensation providing device according to claim 7, wherein, using a spring constant K and a viscosity loss C in the first vibrating system, and a mass M of the vibration-target object, a Q factor, represented by following equation (1), is 1 or more and 10 or less:

$$Q=(MK)^{1/2}/C \quad \text{(Equation 1)}.$$

18. The tactile-sensation providing device according to claim 8, wherein, using a spring constant K and a viscosity loss C in the first vibrating system, and a mass M of the vibration-target object, a Q factor, represented by following equation (1), is 1 or more and 10 or less:

$$Q=(MK)^{1/2}/C \quad \text{(Equation 1)}.$$

19. The tactile-sensation providing device according to claim 9, wherein, using a spring constant K and a viscosity loss C in the first vibrating system, and a mass M of the vibration-target object, a Q factor, represented by following equation (1), is 1 or more and 10 or less:

$$Q=(MK)^{1/2}/C \quad \text{(Equation 1)}.$$

* * * * *